United States Patent
Swedo

(10) Patent No.: US 8,761,023 B2
(45) Date of Patent: Jun. 24, 2014

(54) MONITORING WIRELESS NODES USING PORTABLE DEVICE

(75) Inventor: Keith J. Swedo, Carmel, IN (US)

(73) Assignee: Empire Technology Development, LLC, Wilmington, DE (US)

( * ) Notice: Subject to any disclaimer, the term of this patent is extended or adjusted under 35 U.S.C. 154(b) by 0 days.

(21) Appl. No.: 13/139,240

(22) PCT Filed: Mar. 11, 2011

(86) PCT No.: PCT/US2011/028136
§ 371 (c)(1),
(2), (4) Date: Jun. 10, 2011

(87) PCT Pub. No.: WO2012/125140
PCT Pub. Date: Sep. 20, 2012

(65) Prior Publication Data
US 2013/0343196 A1    Dec. 26, 2013

(51) Int. Cl.
*H04L 12/28*     (2006.01)

(52) U.S. Cl.
USPC ........................................................ 370/241

(58) Field of Classification Search
USPC ........................................................ 370/241
See application file for complete search history.

(56) References Cited

U.S. PATENT DOCUMENTS

2010/0067422 A1* 3/2010 Kadous et al. ................ 370/311
2010/0262717 A1* 10/2010 Critchley et al. ............. 709/251

FOREIGN PATENT DOCUMENTS

WO    WO 2009/088337 A1    7/2009

OTHER PUBLICATIONS

International Preliminary Report on Patentability issued Sep. 17, 2013.
Beutel et al., Demo Abstract: Sensor Network Maintenance Toolkit, Swiss Federal Institute of Technology (ETH) Zurich, 8092 Zurich, Switzerland; beutel,dyer,kevmarti@tik.ee.ethz.ch.
Discenzo et al., Power Scavenging Enables Maintenance-Free Wireless Sensor Nodes; Rockwell Automation, USA; {FMDiscenzo,DChung}@ra.rockwell.com.
International Search Report and Written Opinion PCT/US11/28136 Date Apr. 27, 2011.
Mascarenas et al., A Mobile Host Approach for Wireless Powering and Interrogation of Structural Health Monitoring Sensor Networks, IEEE Sensors Journal vol. 9, issue12, pp. 1719-1726, Dec. 2009. Abstract, sections I, II, IV and Figs. 1, 5, 6.

* cited by examiner

*Primary Examiner* — Sai-Ming Chan
(74) *Attorney, Agent, or Firm* — Turk IP Law, LLC

(57) ABSTRACT

Technologies are generally described for a portable device capable of monitoring wireless nodes and reporting to a wireless node management system is described. The portable device may be used to receive a transmission from the wireless node, which may send the transmission periodically or upon receiving a beacon signal from the portable device. If the wireless node is unable to communicate with its access point, the portable device may interrogate the wireless node to determine its status or retrieve status information from the received transmission. The portable device may record the wireless node information contained in the transmission and provide to a wireless node controller such as an access point along with location information. The portable device may also provide direct information associated with the wireless node's status through a display or similar output device to a user.

19 Claims, 8 Drawing Sheets

MONITORING WIRELESS NODES USING PORTABLE DEVICE

CROSS REFERENCE TO RELATED APPLICATIONS

This application claims the benefit of International Patent Application Serial No. PCT/US2011/028136 filed on Mar. 11, 2011. The disclosures of the International Patent Application are hereby incorporated by reference for all purposes.

BACKGROUND

Unless otherwise indicated herein, the materials described in this section are not prior art to the claims in this application and are not admitted to be prior art by inclusion in this section.

Battery powered wireless nodes are commonly used in homes and businesses. They are used for many different applications including, but not limited to, environmental control, security, and fire alarm systems. Wireless nodes may be in the form of a smoke detector, a motion detector, a camera, or an alarm sensor, a temperature sensor, and comparable ones. Wireless nodes may employ a communication standard such as IEEE 802.15.4, IEEE802.11, or similar ones to communicate with a wireless node manager (e.g., an access point) or with each other.

The present disclosure appreciates that there are several limitations with known schemes to monitor wireless nodes. For example, the communication link between a wireless node and its access point may not be as reliable as in a wired network. One reason for wireless communication link failure may be low battery power, which may result in low transmission power. Another reason for wireless communication link failure is utilization of a low quality channel between the wireless node and the access point. A low quality channel may prevent transmissions from reaching the access point. The reduction in channel quality may be due to interference from other electronic devices, or a newly added physical structure shielding the access point from the wireless node.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

The present disclosure generally describes a method for monitoring wireless nodes using a portable device. An example portable device may receive a signal from a wireless node. The portable device may record the information associated with the received signal and a location associated with the wireless node. The portable device may also provide the recorded information and the location to a wireless node manager for determining status of the wireless node.

The present disclosure also describes a system for monitoring wireless nodes using a portable device. The system may have a portable device that can receive a signal from a wireless node. The system may record information associated with the received signal and a location associated with the wireless node. The system may also provide the recorded information and the location to a wireless node manager. Additionally, the system may have the wireless node manager determine status of the wireless node and respond by issuing an alert and/or performing a corrective action.

The present disclosure further describes a computer-readable storage medium with instructions for monitoring wireless nodes using a portable device. The instructions, when executed, enable the portable device to receive a signal from a wireless node. The instructions also enable the portable device to record information associated with the received signal including sensory information and a location associated with the wireless node. Additionally, the instructions enable the portable device to provide the recorded information and the location to a wireless node manager for determining status of the wireless node.

The present disclosure further describes a portable monitoring module for monitoring wireless nodes having one or more transceivers, a memory, and a processor. The portable monitoring module may receive a signal from a wireless node, record information associated with the received signal including sensory information and a location or identity associated with the wireless node, and provide the recorded information and the location to a wireless node manager for determining a status of the wireless node.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
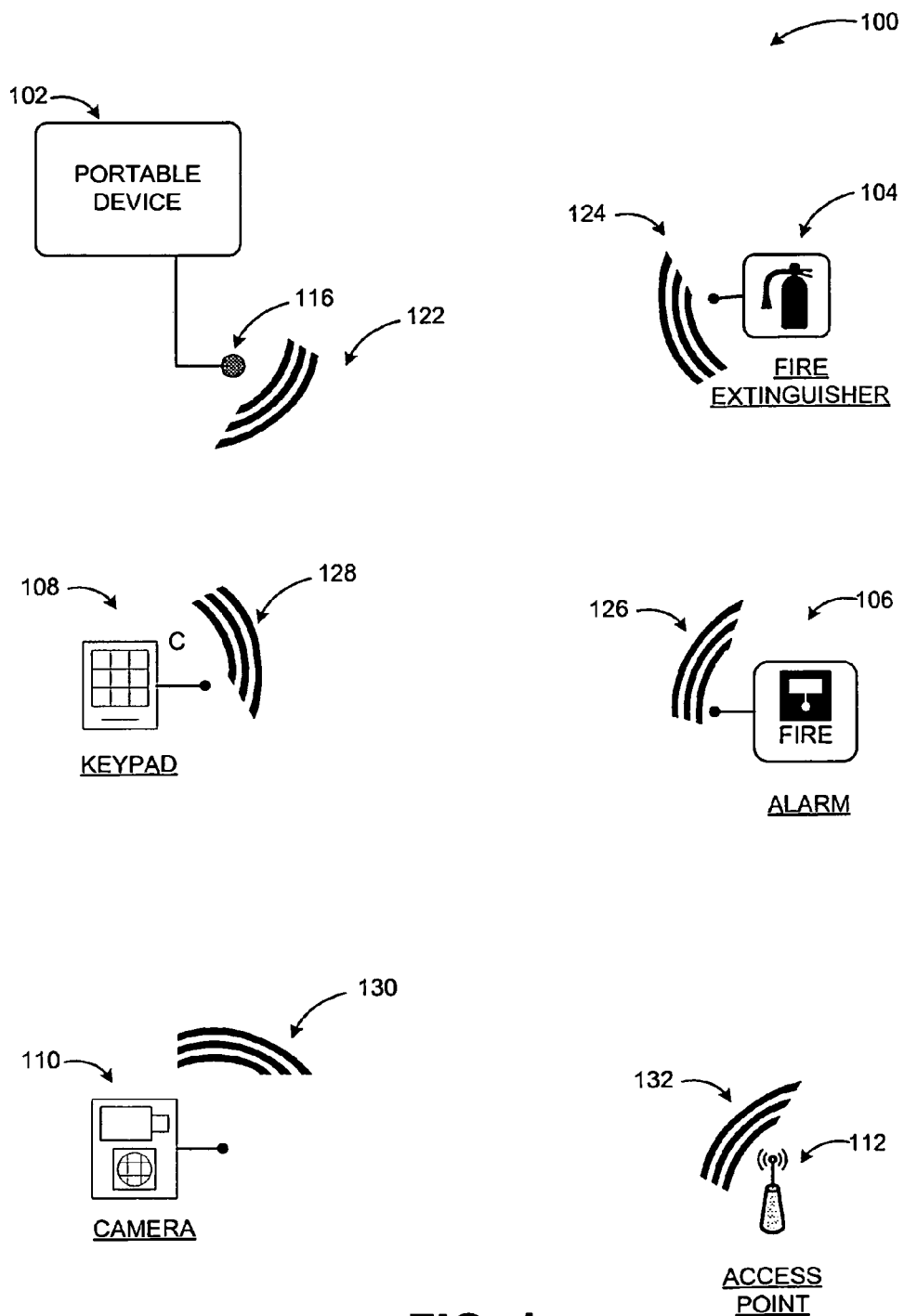
FIG. 1 illustrates an example environment, where wireless nodes may be monitored using a portable device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, a system, and computer readable storage media with instructions to monitor wireless nodes using a portable device, for example as part of a factory sensory equipment verification system.

Briefly stated, a portable device capable of monitoring wireless nodes and reporting to a wireless node management system is described. The portable device may be used to receive a transmission from the wireless node, which may send the transmission periodically or upon receiving a beacon signal from the portable device. If the wireless node is unable to communicate with its access point, the portable device may interrogate the wireless node to determine its status or retrieve status information from the received transmission. The portable device may record the wireless node information contained in the transmission and provide it to a wireless node controller such as an access point along with location information. The portable device may also provide direct information associated with the wireless node's status through a display or similar output device to a user.

While embodiments have been discussed above using specific examples, components, scenarios, and configurations, they are intended to provide a general guideline to be used for monitoring wireless nodes using a portable device. These examples do not constitute a limitation on the embodiments, which may be implemented using other components, schemes, and configurations using the principles described herein. For example, other devices may be used to monitor wireless nodes such as cellular towers, and the like.

FIG. 1 illustrates an example environment in diagram 100, where wireless nodes may be monitored using a portable device. According to an embodiment, multiple devices may be in communication with an access point 112. The access point 112 may be a central point for wireless devices to route their transmissions to other networks. The access point 112 may route the transmissions to a wired network or a wireless network. The access point 112 may also act as a monitor and process the status of its wireless nodes. Alternatively, monitoring function may be delegated to an external controller (not shown). In such a scenario, the access point 112 may route any status related signals from the wireless nodes to the controller.

In the example scenario of diagram 100, a camera 110 may transmit captured video to the access point 112 using wireless transmission 130. A fire alarm 106 may transmit alarm status 126 to the access point 112. When the fire alarm is activated the access point may transmit the fire alarm status to a central fire prevention control system. Also, a fire extinguisher 104 may transmit its fire retardant content status 124 to the access point 112 to be monitored by the central fire prevention control system. In another example embodiment, a keypad 108 may transmit malfunction distress signal 128 preventing entry to a location. One or more of the example wireless nodes in diagram 100 may be smart nodes that communicate with the access point in a bidirectional manner receiving transmission 132 such as instructions, commands, etc. Alternatively, the communication may be unidirectional for some nodes, where they periodically or following a trigger event send their status transmission.

Portable device 102 with an antenna 116 may be in transmission 122 with the access point or any of its nodes to monitor the nodes' status. Portable device 102 may be a dedicated device such as a handheld or mobile device that is used for monitoring wireless nodes mainly (e.g., a person walking around a facility or home and detecting statuses of the wireless nodes). Alternatively, portable device 102 may have an unrelated primary functionality such as being a cellular phone or a portable computing device and have a separate module that is adapted to monitor wireless node status as the device is moved through a location.

The wireless nodes may ignore beacon signals that the wireless node identifies as having been transmitted by a portable device, unless the wireless node is in distress. The wireless node may wake up from a sleep node periodically to listen for incoming signals. However, if the wireless node is in distress, such as being recently unable to receive signals from the access point (which may indicate that the wireless node is also unable to transmit a signal that can be received by the access point), then the wireless node may wake up to listen for beacon signals more frequently than when the wireless node is not in distress. Thus, the wireless node may sooner receive the beacon signal from the portable device, leading to a timelier repair or servicing of the wireless node.

Figure 2:
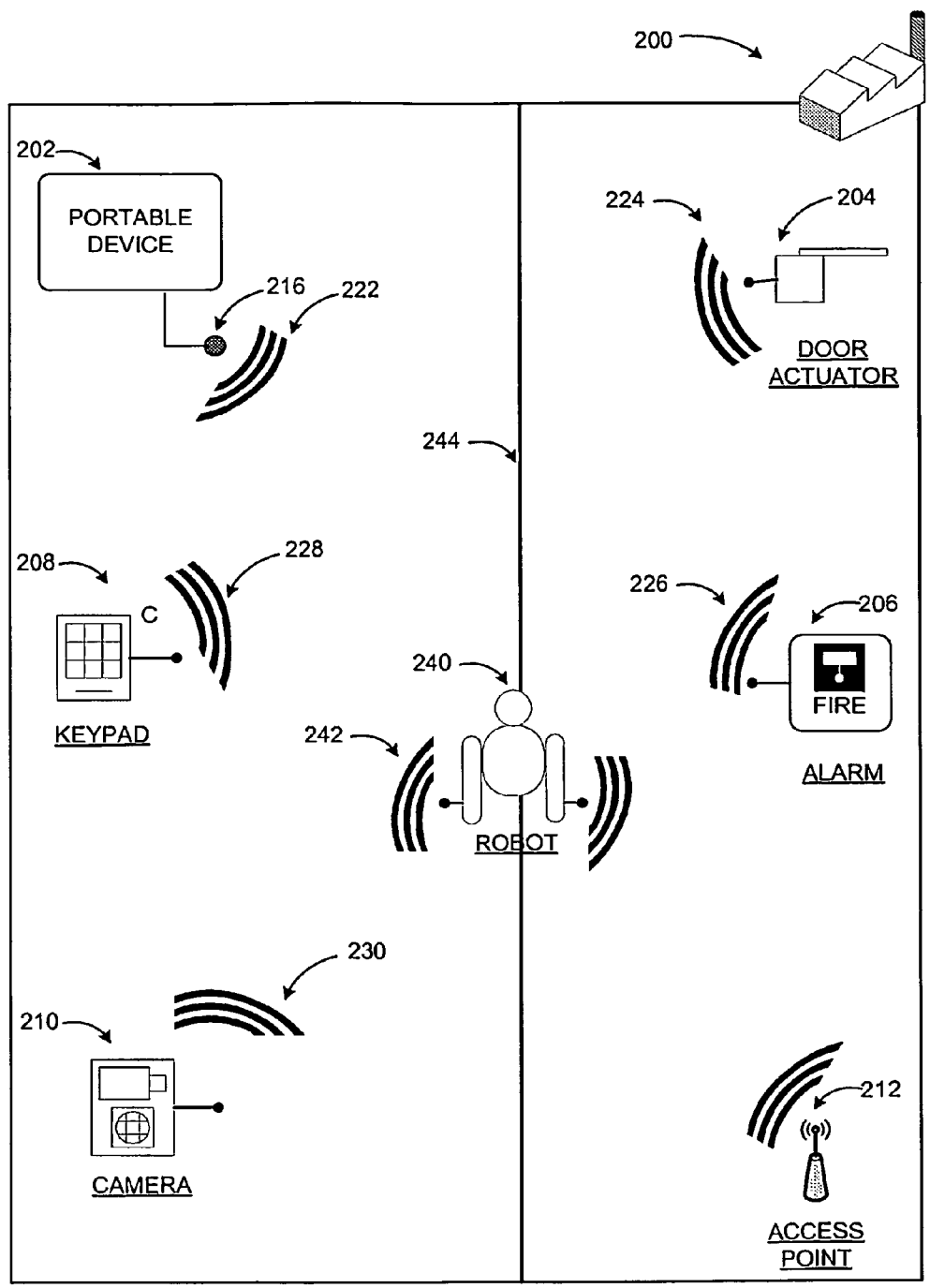
FIG. 2 illustrates another example environment, where wireless nodes may be monitored using a portable device and/or a robotic device with a monitoring module.

FIG. 2 illustrates another example environment, where wireless nodes may be monitored using a portable device and/or a robotic device with a monitoring module. In an example scenario, a robot 240 may act as a portable device that is monitoring wireless node status in a factory 200. The robot may be on a predefined route 244 (e.g. a rail) travelling across the factory 200. The mobility of the robot may give it additional proximity to a wireless node having trouble communicating with an access point 212. The proximity may enable the robot to listen to wireless nodes' status signals, which may be too low to reach the access point, but high enough to be captured by the robot 240.

The robot may use its antenna to transmit (242) monitoring queries (e.g., a beacon signal) to the wireless nodes. For example, a fire alarm 206 with a low battery power may transmit a distress signal 226, which the robot may be in a better position to capture compared to the access point 212. The robot may also receive a status signal 224 from the door actuator 204 to verify that the door actuator still has power during a power outage. In another example, a keypad 208 may transmit a malfunction distress signal 228 preventing entry to a location, which the robot may intercept and relay to a controller or access point 212. Furthermore, the camera 210 may transmit a signal 230 to verify operability, which may be captured by the robot 240. The transmissions may be initiated by the wireless nodes in response to expiration of a predefined period or a trigger event (e.g., available power dropping below a threshold, or being unable to communicate with the access point for a predefined time period). Alternatively, the wireless nodes may respond to a beacon signal from the robot 240.

In addition to robot 240 or in place of it, a portable device 202 such as a cell phone with an antenna 216 may receive status signals from any of the wireless nodes. In an example, the portable device may receive instructions from a controller to verify the status of a nearby wireless node as it is being carried on a route near the wireless node. The portable device may listen for a transmission from the wireless node to determine operability. Alternatively, the portable device may send query transmissions 222 to a smart wireless node to request status information. The portable device may receive a transmission with status information and transmit the received information back to an access point or to the controller. The operations may be performed upon activation by the user or without user involvement.

The portable device 202 and/or the robot 240 may utilize global positioning service (GPS) coordinates to indicate the location of the wireless node. For example, the GPS location of portable device 202 or robot 240 when receiving a transmission may be used to determine the location of the wireless node. The portable device 202 and/or the robot 240 may transmit over a predefined frequency or have multiple antennas to transmit over various frequencies.

Figure 3:
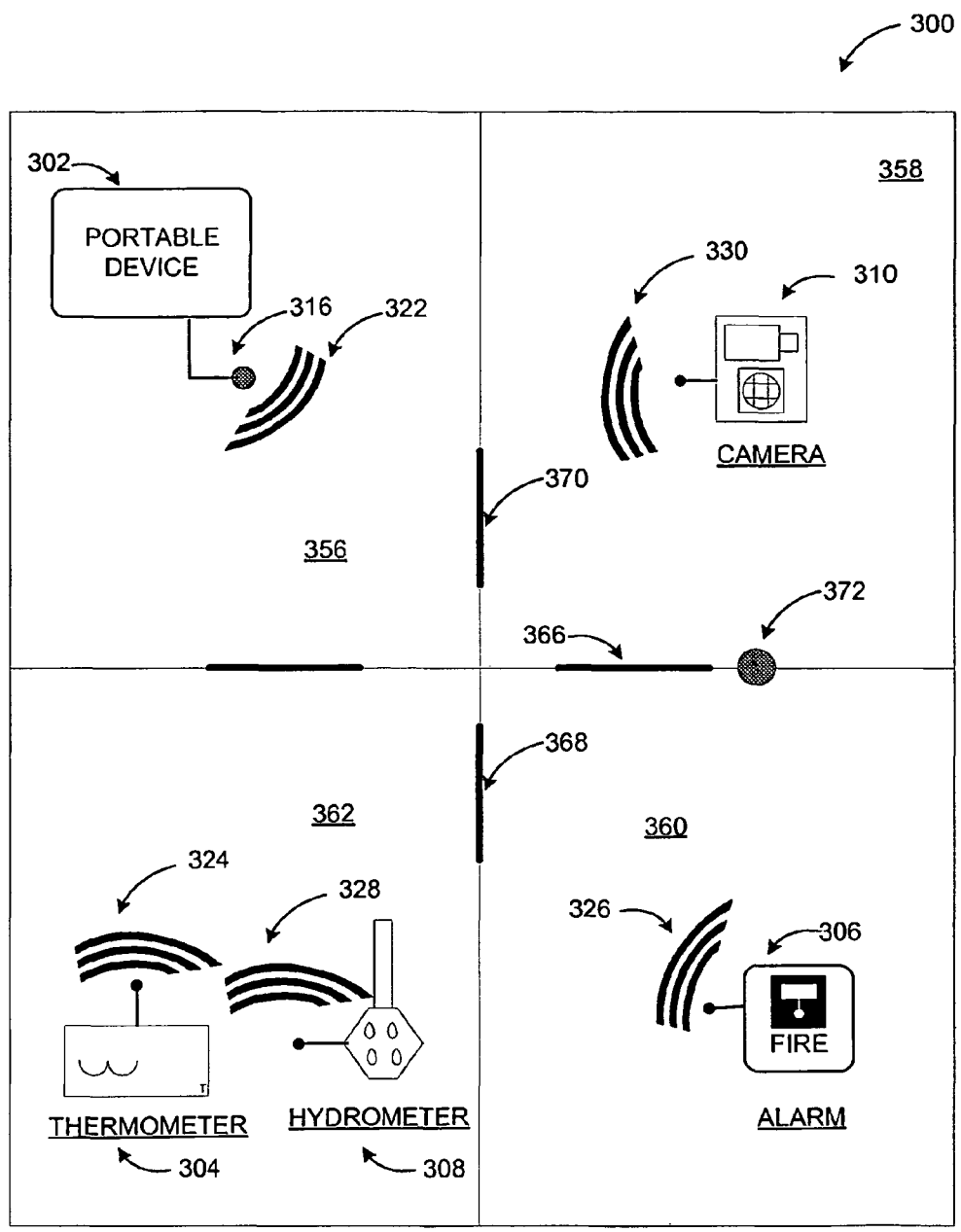
FIG. 3 illustrates a further example environment, where wireless nodes in different locations may be monitored using a portable device.

FIG. 3 illustrates a further example environment, where wireless nodes in different locations may be monitored using a portable device according to embodiments. In diagram 300, a portable device 302 monitors an office with multiple wireless nodes. The portable device may transmit status queries to wireless nodes in room 356 connected to a room 358 through a door 370. A camera may be recording video in room 358 and may transmit beacon signals 330 in a repeating pattern to indicate its operational status.

A beam 372 and metal doors 366 and 368 may cause interference between an access point communicating with at least some of the wireless nodes. The portable device may receive requests from the access point to query the alarm 306 and thermometer 304, and hydrometer 308 in rooms 360 and 362 to verify their operational status. The thermometer 304 measures the temperature of room 362 while the hydrometer 308 measures the humidity. The portable device may query the wireless nodes and receive status information from transmissions 324, 328, and 326 from the thermometer 304, hydrometer 308, and fire alarm 306.

Figure 4:
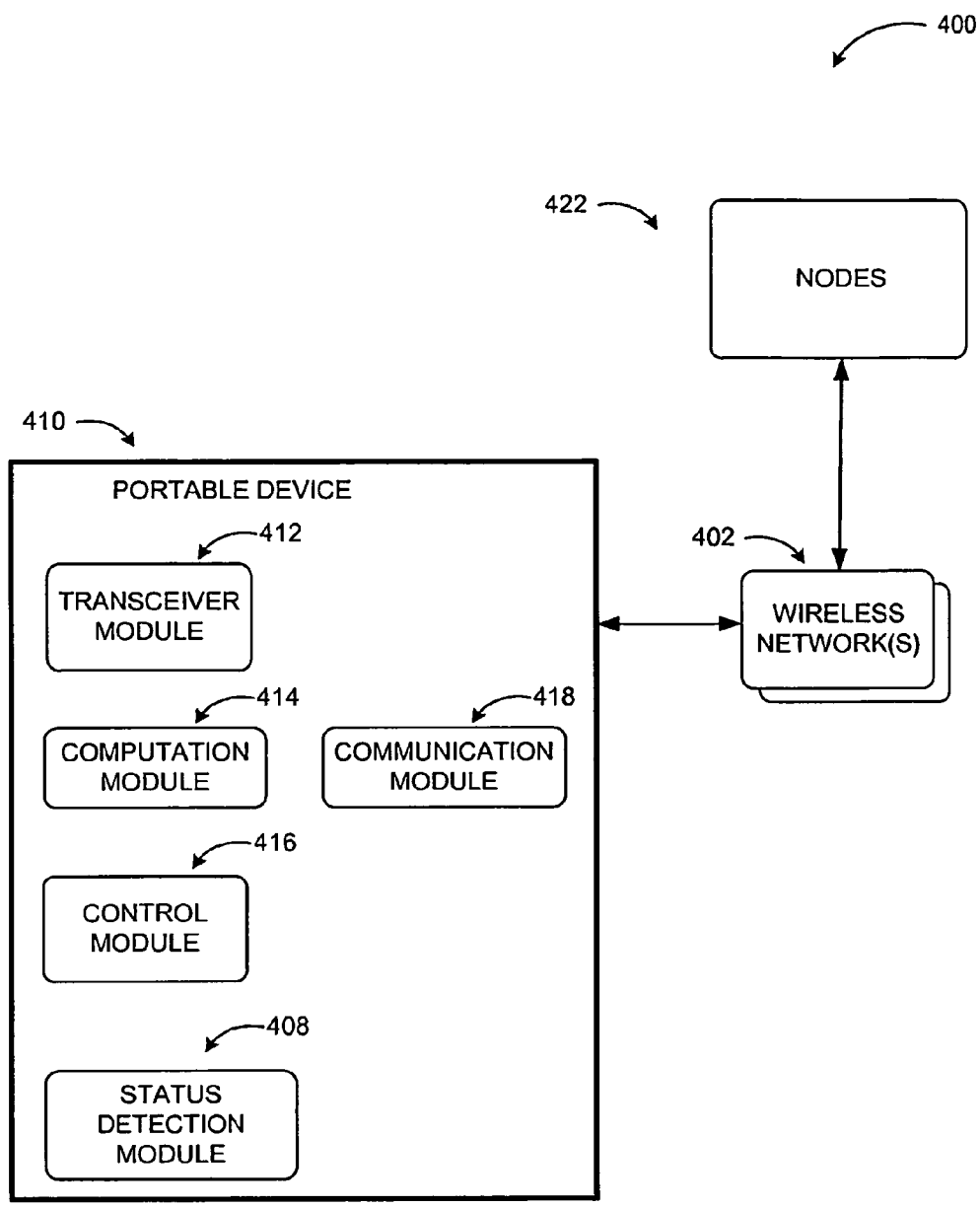
FIG. 4 illustrates an example portable device communicating with one or more wireless nodes through wireless network(s)

FIG. 4 illustrates an example portable device adapted to communicate with one or more wireless nodes through wireless network(s) according to embodiments. In diagram 400, wireless nodes 422 may communicate with the portable device 410 through wireless network(s) 402. The wireless network(s) may contain multiple access points to enable communication. Alternatively, the portable device 410 may be in direct communication with the nodes. The portable 410 device may have a transceiver module 412. The transceiver module 412 may include an antenna to handle communication in designated frequencies with the wireless nodes. Alternatively, portable device 410 may include a plurality of transceiver modules for different frequencies or communication types. The computation module 414 may analyze incoming node status information and recommend a course of action to a controller. The course of action may be issuing an alert to an administrator (e.g., an email, a voicemail, a text message, etc.), transmitting corrective instructions (e.g., reset) to a smart wireless node, or comparable ones.

The portable device 410 may also have a communication module 418 to interpret incoming signals from the nodes. The communication module has the necessary protocols to decode or encode signals based on standards used in communication with the wireless nodes. In some embodiments, communication module 418 and transceiver module 412 may be integrated. Additionally, the portable device 410 may include a control module 416. The control module 416 may manage the other modules and coordinate module interactions. Finally, a status detection module 408 may have features to interpret the node status information. An example may be ability to detect malfunction codes in a signal from a wireless node and transmit the wireless node's location or identity by using location information or identity information provided by the wireless node or the portable device's location information to a controller.

Figure 5:
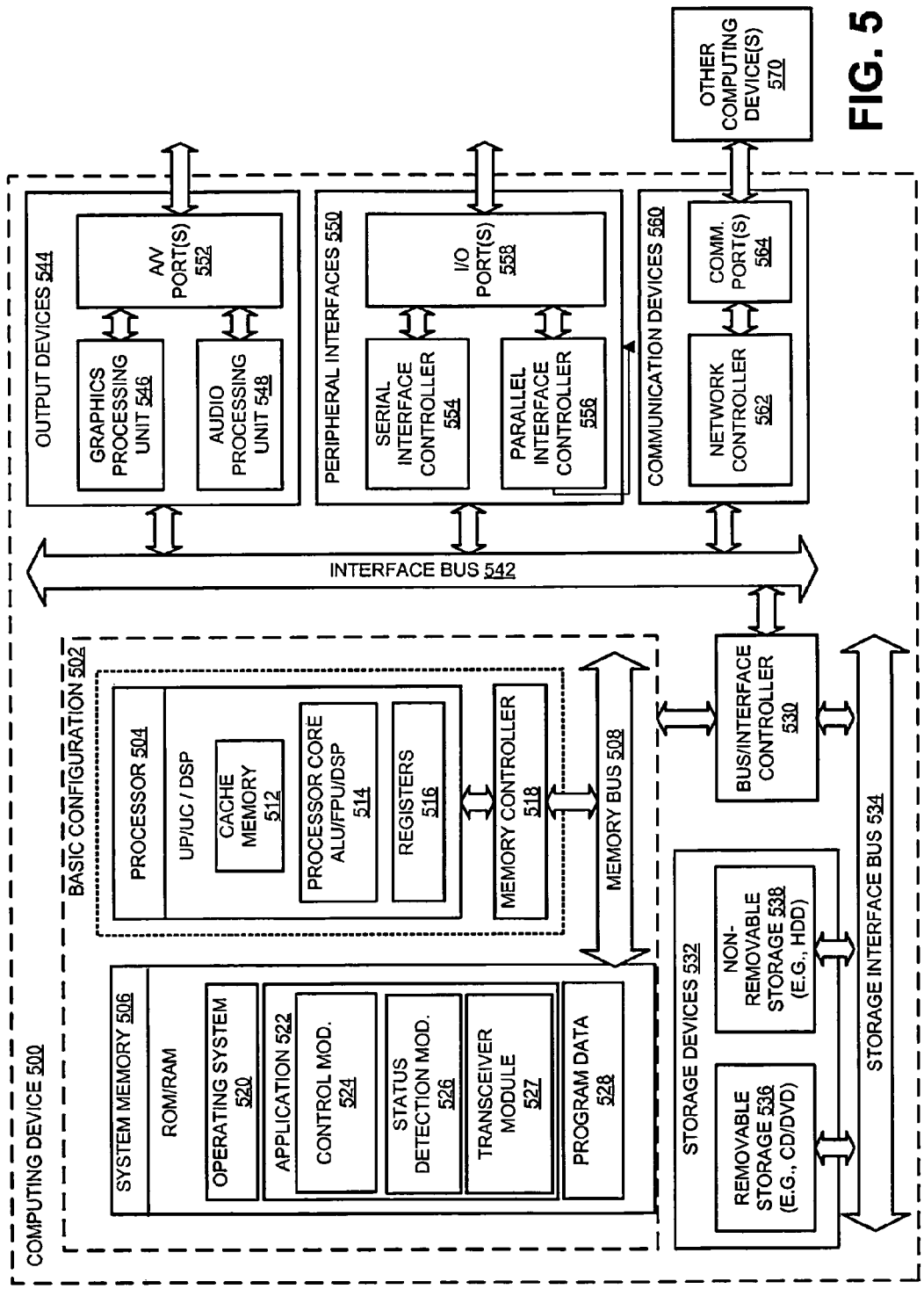
FIG. 5 illustrates a general purpose computing device, which may be used to implement monitoring of wireless nodes using a portable device.

FIG. 5 illustrates an example general purpose computing device 500, which may be used to implement monitoring of wireless nodes using a portable device according to at least some examples of the present disclosure. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (pP), a microcontroller (pC), a digital signal processor (DSP), or any combination thereof. Processor 504 may include one more levels of caching, such as a level cache memory 512, a processor core 514, and registers 516. Example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520 and one or more applications 522. Application 522 may include a control module 524 for managing operations associated with monitoring wireless nodes, a status detection module 526 that is arranged to receive a signal from a wireless node, record information and location associated with the received signal, and any other processes, methods and functions as discussed above. Application 522 may also include transceiver module 527, which may control wireless communications with the wireless nodes (for example, in conjunction with communication devices 560). Program data 528 may include one or more monitoring data received by the status detection module. In some embodiments, application 522 may be arranged to operate with program data 528 on operating system 520 such that wireless nodes are monitored as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 542 for facilitating communication from various interface devices (e.g., output devices 544, peripheral interfaces 550, and communication devices 560) to basic configuration 502 via bus/interface controller 530. Example output devices 544 include a graphics processing unit 546 and an audio processing unit 548, which may be configured to communicate to various external devices such as a display or speakers via one or more AN ports 552. Example peripheral interfaces 550 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 560 includes a network controller 562, which may be arranged to facilitate communications with one or more other computing devices 570 over a network communication link via one or more communication ports 564.

The network communication link may be one example of a communication medium. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations. Moreover computing device 500 may be implemented as a networked system or as part of a general purpose or specialized server.

Networks for a networked system including computing device 500 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 6:
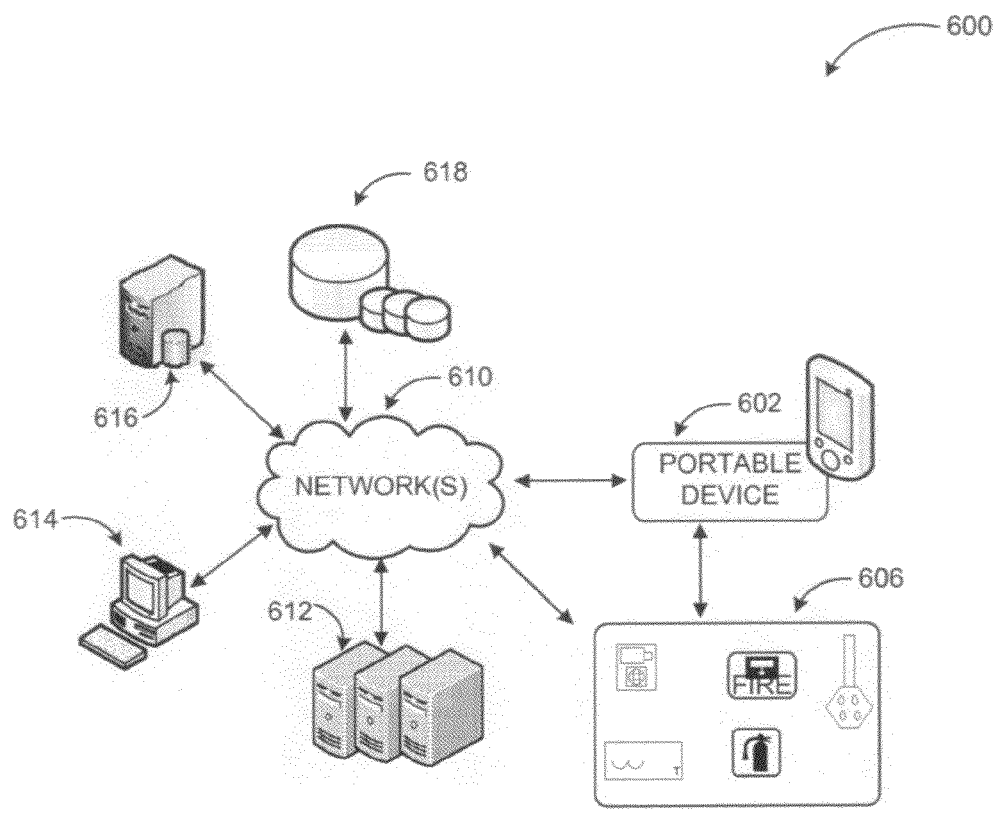
FIG. 6 illustrates a networked environment, where wireless nodes may be monitored through a portable device.

FIG. 6 illustrates a networked environment, where wireless nodes may be monitored by a portable device in accordance with at least some embodiments described herein. Monitoring wireless nodes by a portable device may be implemented through separate applications, one or more integrated applications, one or more centralized services, or one or more distributed services on one more computing devices. FIG. 6 illustrates an example of a distributed system 600 implementation through networks 610.

As discussed previously, wireless node status may be monitored by a portable device 602. Wireless nodes 606 may be queried to provide status information. Wireless nodes 606 may also provide status information without being queried. The portable device 602 (e.g. a general purpose mobile computing device) may be configured to monitor wireless node information such as an operational signal, a distress signal, a beacon signal, etc. Portable device 602 may also be configured to communicate such data to an application or service executed on computing device 614 or one or more of the servers 612 through network(s) 610. The application or service may be adapted to manage one or more of wireless nodes, and perform similar tasks. Location information, status information, and other data associated with the wireless nodes may be stored in one or more data stores such as data stores 618 and be directly accessible through network(s) 610. Alternatively, data stores 618 may be managed by a database server 616.

Network(s) 610 may comprise any topology of servers, clients, switches, routers, modems, Internet service providers (ISPs), and any appropriate communication media (e.g., wired or wireless communications). A system according to embodiments may have a static or dynamic network topology. Network(s) 610 may include a secure network such as an enterprise network (e.g., a LAN, WAN, or WLAN), an unsecure network such as a wireless open network (e.g., IEEE 502.11wireless networks), or a world-wide network such (e.g., the Internet). Network(s) 610 may also comprise a plurality of distinct networks that are adapted to operate together. Network(s) 610 can be configured to provide communication between the nodes described herein. By way of example, and not limitation, network(s) 610 may include wireless media such as acoustic, RF, infrared and other wireless media. Furthermore, network(s) 610 may be portions of the same network or separate networks.

Example embodiments may also include methods of monitoring wireless nodes using a portable device as described herein. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 7:
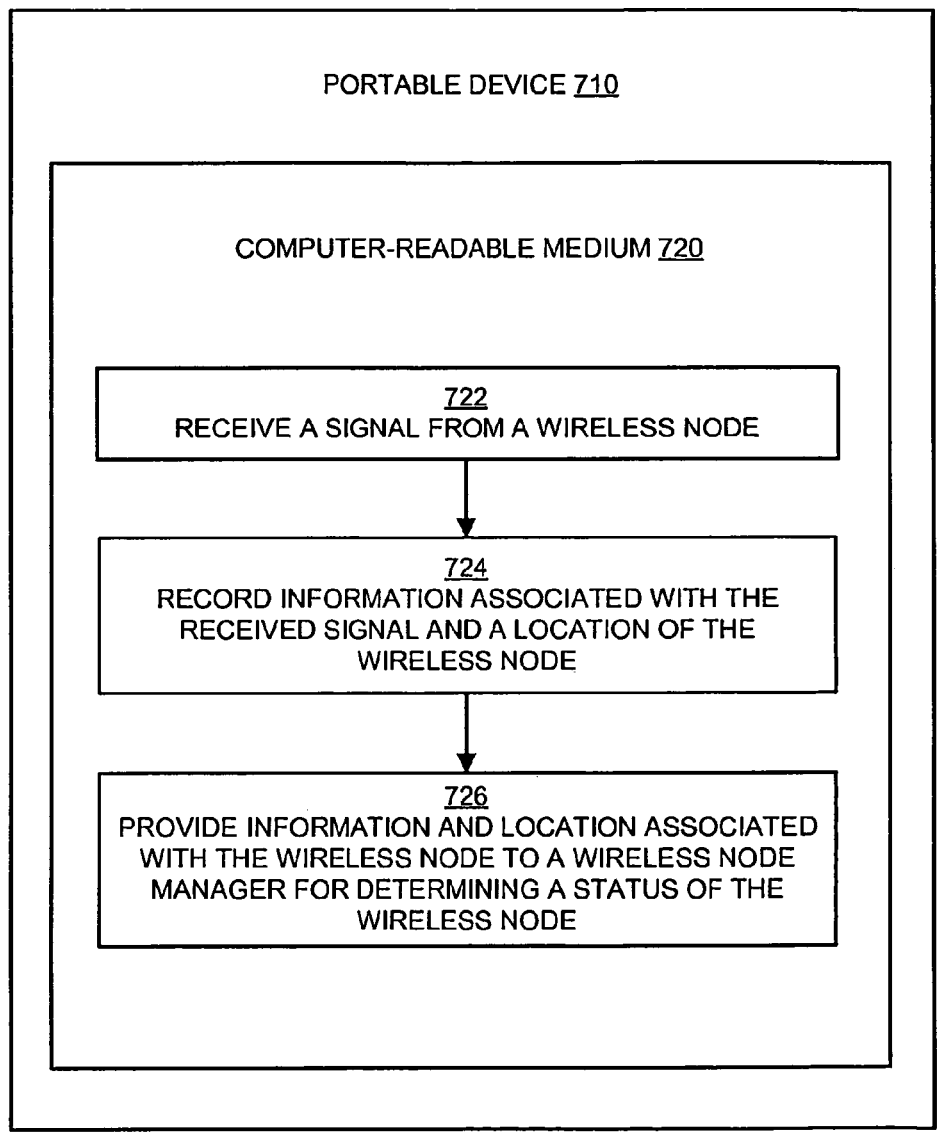
FIG. 7 is a flow diagram illustrating an example method for monitoring wireless nodes using a portable device that may be performed by a computing device such as device 500 in FIG. 5 or a portable device such as portable device 410 of FIG. 4.

FIG. 7 is a flow diagram illustrating an example method for monitoring wireless nodes using a portable device that may be performed by a computing device such as device 500 in FIG. 5 or a portable device such as portable device 410 of FIG. 4. Thus, the portable device 710 may be embodied as computing device 500, or similar devices executing instructions stored in computer-readable medium 720 for enabling the method. A process of monitoring wireless nodes may include one or more operations, functions or actions as is illustrated by one or more of blocks 722, 724, and/or 726.

Some example processes may begin with operation 722, "RECEIVE A SIGNAL FROM A WIRELESS NODE". Operation 722 may be performed, for example, by robot 240 of FIG. 2. At operation 722, the signal may contain wireless node status information such as operational status. The operational status information may contain a low battery power alert, other alerts about of a failing wireless node, or an alert that the wireless node has been unable to communicate with the access point for a predefined period of time.

Operation 722 is followed by operation 724, "RECORD INFORMATION ASSOCIATED WITH THE RECEIVED SIGNAL AND A LOCATION OF THE WIRELESS NODE". At operation 724, the portable device may interpret the signal to decode status information about the wireless node. The portable device may record the status information along with location information about the wireless node. The location information may be provided by the wireless node. Alternatively, the portable device may record its own location information in absence of wireless node provided location information.

Operation 724 is followed by operation 726, "PROVIDE INFORMATION AND LOCATION ASSOCIATED WITH THE WIRELESS NODE TO A WIRELESS NODE MANAGER FOR DETERMINING A STATUS OF THE WIRELESS NODE". At operation 726, the portable device may transmit the recorded information or a report based on the recorded information to a wireless node manager, which may be an access point or a controller. In addition, portable device 710 may also transmit a recommended course of action to the wireless node manager such as an alert to check the wireless node.

The operations included in the process of FIG. 7 described above are for illustration purposes. Monitoring wireless nodes may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

Figure 8:
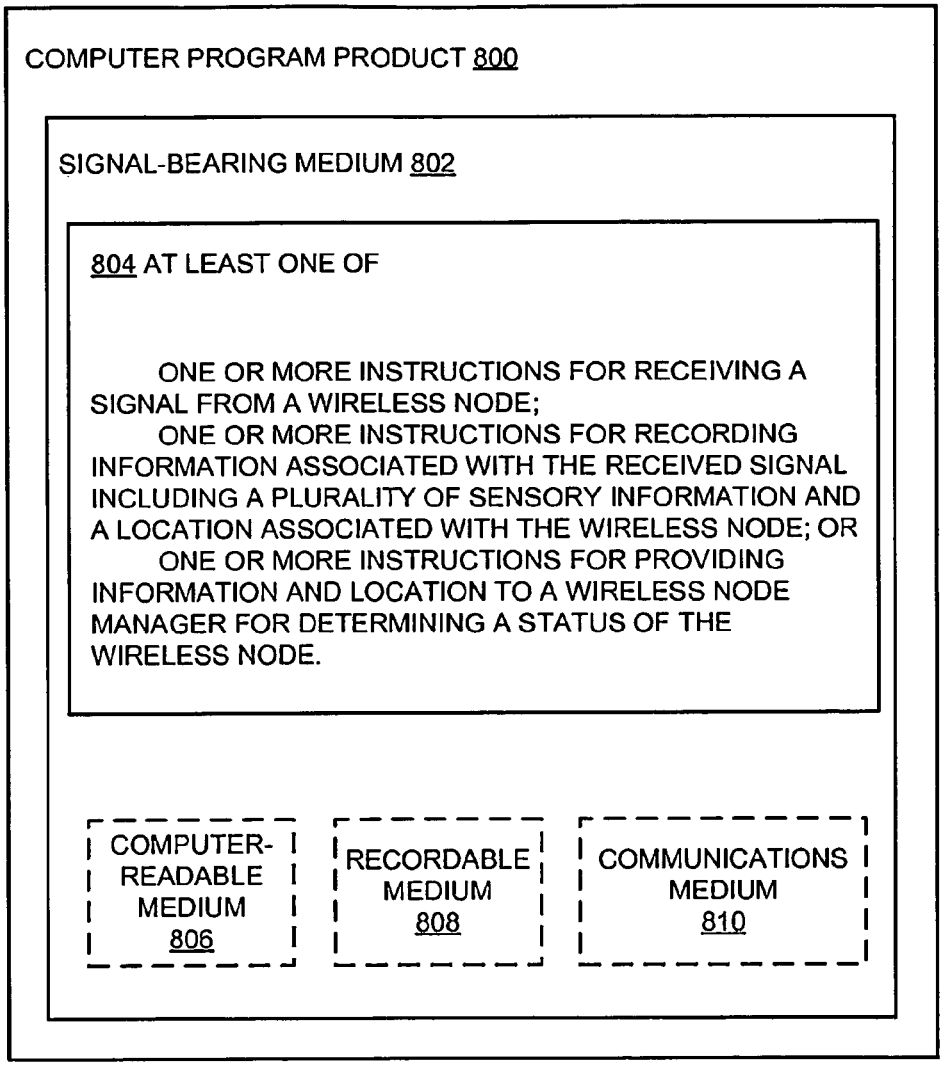
FIG. 8 illustrates a block diagram of an example computer program product, all arranged in accordance with at least some embodiments described herein.

FIG. 8 illustrates a block diagram of an example computer program product 800 arranged in accordance with at least some embodiments described herein. In some examples, as shown in FIG. 8, computer program product 800 may include a signal bearing medium 802 that may also include machine readable instructions 804 that, when executed by, for example, a processor or controller or computing device, may provide the functionality described above with respect to FIG. 1 through FIG. 7. Thus, for example, referring to portable device 410, one or more of the modules 412, 414, 416, 418, and 408 may undertake one or more of the tasks shown in FIG. 8 in order to monitor a wireless node as described herein. Some of those instructions may include receiving a signal from a wireless node; recording information associated with the received signal including a plurality of sensory information and a location of the wireless node; or providing information and location to a wireless node manager for determining a status of the wireless node.

In some implementations, signal bearing medium 802 depicted in FIG. 8 may encompass a computer-readable medium 806, such as, but not limited to, a hard disk drive, a Compact Disc (CD), a Digital Versatile Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, program product 800 may be conveyed to one or more modules of the portable device 410 by an RF signal bearing medium 802, where the signal bearing medium 802 is conveyed by a wireless communications medium 810 (e.g., a wireless communications medium conforming with the IEEE 802.11 standard).

The present disclosure generally describes method for monitoring wireless nodes using a portable device. An example portable device may receive a signal from a wireless node. The portable device may record the information associated with the received signal and a location associated with the wireless node. The portable device may also provide the recorded information and the location to a wireless node manager for determining status of the wireless node.

The portable device may also transmit a beacon signal and receive the signal from the wireless node in response to the transmitted beacon signal. The received signal may be a distress signal. The portable device may also receive the signal while moving along a predetermined path. The recorded information may include the signal. The recorded information may also include the status of the wireless node.

Additionally, the portable device may collect recorded information and locations from the wireless nodes and transmit the collected information and locations to the wireless node manager. Alternatively, the portable device may collect recorded information and locations from the wireless nodes, analyze the recorded information, and transmit a status report associated with the wireless nodes to the wireless node manager.

In another example, the portable device may receive a corrective action instruction from the wireless node manager and transmit a signal based on the corrective action instruction to the wireless node. Additionally, the portable device may be a cellular phone, a portable computer, and a special purpose communication device.

In yet another example, the portable device may adjust a communication mode of the portable device to communicate with the wireless mode. The communication mode may include a frequency, a modulation, and/or a decode/encode scheme. The portable device may include additional transceiver for communicating with the wireless node. Additionally, the portable device may communicate with the wireless node employing 802.11a, b, g, and n standards.

The present disclosure also describes a system for monitoring wireless nodes using a portable device. The system may have a portable device that can receive a signal from a wireless node. The system may record information associated with the received signal and a location associated with the wireless node. The system may also provide the recorded information and the location to a wireless node manager. Additionally, the system may have the wireless node manager determine status of the wireless node and respond by issuing an alert and/or performing a corrective action.

In an example embodiment, the wireless node manager may transmit a corrective action instruction to the portable device, and the portable device may transmit a signal based on the corrective action instruction to the wireless node.

In another example, portable device may determine a time since last reported contact with the wireless node, may compare the time since last reported contact with an expected period of contact with the wireless node, and if the time since last reported contact is greater than the expected period of contact with the wireless node, may notify the wireless node manager. The portable device may also provide a visual cue and/or a sound alert upon detecting a wireless node with the time since last reported contact greater than the expected period of contact with the wireless node.

In yet another example, the wireless node manager may issue the alert by transmitting a wireless message, sending an email, sending a voicemail, and/or generating a report. The wireless node may be in a sleep mode. The portable device may wake up the wireless node by transmitting a beacon signal.

In another embodiment, the portable device may be a robotic device moving on a predetermined route. The robotic device may adjust the predetermined route dynamically based on detected wireless nodes. The robotic device may also monitor the wireless node using a Global Position Satellite (GPS) module and transmit the beacon signal when within a proximity of GPS coordinates of the wireless node. Additionally, the received signal may include sensory information collected by the wireless node. The portable device may include other transceiver for providing communication services. And, the portable device may be a cellular phone, a portable computer, and a special purpose communication device.

The present disclosure further describes a computer-readable storage medium with instructions for monitoring wireless nodes using a portable device. The instructions, when executed, enable the portable device to receive a signal from a wireless node. The instructions also enable the portable device to record information associated with the received signal including sensory information and a location associated with the wireless node. Additionally, the instructions enable the portable device to provide the recorded information and the location to a wireless node manager for determining status of the wireless node.

In an example embodiment, the wireless node may be a simple node. The received signal from the simple node may be a response to a beacon signal transmitted by the portable device. Alternatively, the wireless node may be a smart node. The received signal from the smart node may include a last communication time with an access time and/or a node status information including a remaining battery power.

The present disclosure further describes a portable monitoring module for monitoring wireless nodes having one or more transceivers, a memory, and a processor. The portable monitoring module may receive a signal from a wireless node; may record information associated with the received signal including sensory information and a location associated with the wireless node; and may provide the recorded information and the location to a wireless node manager for determining a status of the wireless node.

In an example embodiment, the portable monitoring module may transmit a beacon signal and receive the signal from the wireless node in response to the transmitted beacon signal. Additionally, the portable monitoring module may collect recorded information and locations from wireless nodes and transmit the collected information and locations to the wireless node manager. The communication mode may include a frequency, a modulation, and/or a decode/encode scheme. The portable monitoring module may be integrated into a cellular phone, a robotic device, or a portable computer.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical manufacturing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Although portable devices may be described herein as transmitting signals to wireless nodes, it is to be understood that it is also possible for the portable device to only receive signals from one or more wireless nodes without the portable device also transmitting signals to the one or more wireless nodes.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for monitoring wireless nodes using a portable device, the method comprising:
   receiving a signal from a wireless node at a portable device, wherein the portable device is a robotic device moving on a predetermined route;
   adjusting the predetermined route dynamically based on the wireless node;
   recording information associated with the received signal and a location and/or identity associated with the wireless node, wherein the recorded information includes a status of the wireless node; and
   providing the recorded information and the location and/or identity to a wireless node manager for determining the status of the wireless node.

2. The method according to claim 1, further comprising:
   transmitting a beacon signal; and
   receiving the signal from the wireless node in response to the transmitted beacon signal.

3. The method according to claim 1, further comprising receiving the signal while moving along a predetermined path.

4. The method according to claim 1, further comprising:
   collecting recorded information and locations and/or identities from a plurality of wireless nodes; and
   transmitting the collected information and locations and/or identities to the wireless node manager.

5. The method according to claim 1, further comprising:
   collecting recorded information and locations and/or identities from a plurality of wireless nodes;
   analyzing the recorded information; and
   transmitting a status report associated with the plurality of wireless nodes to the wireless node manager.

6. The method according to claim 1, further comprising:
   receiving a corrective action instruction from the wireless node manager; and
   transmitting a signal based on the corrective action instruction to the wireless node.

7. The method according to claim 1, further comprising adjusting a communication mode of the portable device to communicate with the wireless mode wherein the communication mode includes at least one from a set of: a frequency, a modulation, and/or a decode/encode scheme.

8. A system for monitoring wireless nodes using a portable device, the system comprising:
   a portable device, wherein the portable device is a robotic device moving on a predetermined route configured to:
      receive a signal from a wireless node;
      adjust the predetermined route dynamically based on the wireless node;
      record information associated with the received signal and a location and/or identity associated with the wireless node, wherein the recorded information includes a status of the wireless node; and
      provide the recorded information and the location and/or identity to a wireless node manager; and
   the wireless node manager configured to:
      determine the status of the wireless node; and
      at least one of: issue an alert and/or perform a corrective action.

9. The system according to claim 8, wherein the wireless node manager is further configured to transmit a corrective action instruction to the portable device, and the portable device is further configured to transmit a signal based on the corrective action instruction to the wireless node.

10. The system according to claim 8, wherein the portable device is further configured to:
    determine a time since last reported contact with the wireless node;
    compare the time since last reported contact with an expected period of contact with the wireless node; and
    if the time since last reported contact is greater than the expected period of contact with the wireless node, notify the wireless node manager.

11. The system according to claim 8, wherein the wireless node manager is configured to issue the alert by performing one or more of: transmit a wireless message, send an email, send a voicemail, and/or generate a report.

12. The system according to claim 8, wherein the wireless node is in a sleep mode and the portable device is further configured to wake up the wireless node by transmitting a beacon signal.

13. The system according to claim 8, wherein the robotic device is further configured to:
    monitor the wireless node using a Global Position Satellite (GPS) module; and
    transmit the beacon signal when within a proximity of GPS coordinates of the wireless node.

14. The system according to claim 8, wherein the portable device is one of a cellular phone, a portable computer, and a special purpose communication device that includes at least one other transceiver for providing communication services, and wherein the portable device is configured to communicate with the wireless node employing one of a 802.11 a, b, g, and n standards.

15. A portable monitoring module for monitoring wireless nodes, comprising:
    one or more transceivers;
    a memory; and
    a processor configured to:
       receive a signal from a wireless node at a portable device of the portable monitoring module, wherein the portable device moves on a predetermined route;
       adjust the predetermined route dynamically based on the wireless node;
       record information associated with the received signal and a location and/or identity associated with the wireless node, wherein the recorded information includes a status of the wireless node; and
       provide the recorded information and the location and/or identity to a wireless node manager for determining the status of the wireless node.

16. The portable monitoring module according to claim 15, wherein the processor is further configured to:
    transmit a beacon signal; and
    receive the signal from the wireless node in response to the transmitted beacon signal.

17. The portable monitoring module according to claim 15, wherein the processor is further configured to:
    collect recorded information and locations and/or identities from a plurality of wireless nodes; and
    transmit the collected information and locations and/or identities to the wireless node manager.

18. The portable monitoring module according to claim 15, wherein a communication mode includes at least one from a set of: a frequency, a modulation, and/or a decode/encode scheme.

19. The portable monitoring module according to claim 15, wherein the portable monitoring module is integrated into one of a cellular phone, a robotic device, or a portable computer.

* * * * *

UNITED STATES PATENT AND TRADEMARK OFFICE
CERTIFICATE OF CORRECTION

| | |
|---|---|
| PATENT NO. | : 8,761,023 B2 |
| APPLICATION NO. | : 13/139240 |
| DATED | : June 24, 2014 |
| INVENTOR(S) | : Swedo |

It is certified that error appears in the above-identified patent and that said Letters Patent is hereby corrected as shown below:

In the Specification

Column 6, Line 7, delete "(pP), a microcontroller (pC)," and insert -- ($\mu$P), a microcontroller ($\mu$C), --, therefor.

Column 7, Line 9, delete "AN" and insert -- A/V --, therefor.

Signed and Sealed this
Twenty-eighth Day of October, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,761,023 B2 | Page 1 of 1 |
| APPLICATION NO. | : 13/139240 | |
| DATED | : June 24, 2014 | |
| INVENTOR(S) | : Swedo | |

It is certified that error appears in the above-identified patent and that said Letters Patent is hereby corrected as shown below:

On the title page item (73) delete "," between "Development" and "LLC" and should read:

Empire Technology Development LLC

Signed and Sealed this
Sixteenth Day of December, 2014

Michelle K. Lee
*Deputy Director of the United States Patent and Trademark Office*